(12) United States Patent
Lundstrom (10) Patent No.: US 10,009,758 B2
(45) Date of Patent: Jun. 26, 2018

(54) WIFI FIXED WIRELESS PERSONAL SERVICES

(71) Applicant: Telefonaktiebolaget L M Ericsson (publ), Stockholm (SE)

(72) Inventor: Anders Lundstrom, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 15/338,132

(22) Filed: Oct. 28, 2016

(65) Prior Publication Data

US 2017/0048697 A1    Feb. 16, 2017

Related U.S. Application Data

(63) Continuation of application No. 14/130,266, filed as application No. PCT/EP2012/059913 on May 25, 2012, now Pat. No. 9,521,549.

(Continued)

(51) Int. Cl.
  *H04W 8/26* (2009.01)
  *H04W 12/06* (2009.01)
  (Continued)

(52) U.S. Cl.
  CPC .......... *H04W 8/26* (2013.01); *H04L 61/2015* (2013.01); *H04W 12/06* (2013.01); *H04W 88/16* (2013.01); *H04L 63/0892* (2013.01); *H04W 88/08* (2013.01)

(58) Field of Classification Search
  CPC .................................................. H04W 88/16
  See application file for complete search history.

(56) References Cited

U.S. PATENT DOCUMENTS 8,391,218 B1    3/2013  Joshi et al.
2006/0098614 A1  5/2006  Moon et al.
(Continued)

FOREIGN PATENT DOCUMENTS

EP  1990951 A1   11/2008
WO  2009132435 A1  11/2009
WO  2009132435 A8  10/2010

OTHER PUBLICATIONS

3GPP TS 23.401 V9.8.0, "General Packet Radio Service (GPRS) enhancements for Evolved Universal Terrestrial Radio Access Network (E-UTRAN) access," ETSI TS 123 401 V9.8.0, LTE, Mar. 2011, 262 pages.

(Continued)

*Primary Examiner* — Lester G Kincaid
*Assistant Examiner* — Daniel G. Bassett
(74) *Attorney, Agent, or Firm* — Nicholson De Vos Webster & Elliott LLP (57) ABSTRACT

A method by an access point to provide wireless terminals with access to a packet core network. The method includes attaching to the packet core network via a cellular radio access network, where the access point is configured to operate as a router of a subnet associated with an Internet Protocol (IP) address space, relaying signaling between a wireless terminal and the packet core network to authenticate/authorize the wireless terminal to access the packet core network and to allocate to the wireless terminal an IP address, establishing a dedicated Packet Data Network (PDN) connection for the wireless terminal between the access point and a packet gateway of the packet core network, establishing one or more dedicated bearers associated with the dedicated PDN connection, and routing packets between the wireless terminal and the packet core (Continued)

network via the one or more dedicated bearers associated with the dedicated PDN connection.

18 Claims, 10 Drawing Sheets

Related U.S. Application Data (60) Provisional application No. 61/503,214, filed on Jun. 30, 2011.

(51) Int. Cl.
*H04W 88/08* (2009.01)
*H04W 88/16* (2009.01)
*H04L 29/12* (2006.01)
*H04L 29/06* (2006.01)

(56) References Cited

U.S. PATENT DOCUMENTS

| | | | |
|---|---|---|---|
| 2006/0233128 A1 | 10/2006 | Sood et al. | |
| 2006/0248229 A1* | 11/2006 | Saunderson | H04L 12/4641 709/245 |
| 2009/0175221 A1 | 7/2009 | Visuri et al. | |
| 2011/0021196 A1* | 1/2011 | Grayson | H04W 48/02 455/435.2 |
| 2011/0078764 A1 | 3/2011 | Bichot | |
| 2011/0103310 A1* | 5/2011 | Stojanovski | H04L 61/2514 370/328 |
| 2012/0099429 A1* | 4/2012 | Ludwig | H04L 43/028 370/235 |
| 2012/0099433 A1* | 4/2012 | Willars | H04L 29/12066 370/241 |
| 2012/0120828 A1 | 5/2012 | Anderson et al. | |
| 2012/0120843 A1 | 5/2012 | Anderson et al. | |
| 2012/0120913 A1 | 5/2012 | Wirtanen et al. | |
| 2012/0250601 A1* | 10/2012 | Choi | H04W 88/04 370/315 |
| 2012/0269162 A1 | 10/2012 | Vesterinen et al. | |
| 2014/0013392 A1 | 1/2014 | Vikberg et al. | |

OTHER PUBLICATIONS

3GPP TS 23.402 V10.3.0, "Architecture enhancements for non-3GPP accesses," Universal Mobile Telecommunication System (UMTS); LTE; Release 10, Mar. 2011, 229 pages.
3GPP TS 23.402 V10.4.0, "Architecture enhancements for non-3GPP accesses," 3rd Generation Partnership Project, Technical Specification Group Services and System Aspects, Jun. 2011, 231 pages.
3GPP TS 23.402 V9.8.0, "Architecture enhancements for non-3GPP accesses," ETSI TS 123 402 V9.8.0, Universal Mobile Telecommunications System (UMTS), LTE, Mar. 2011, 202 pages.
Non-Final Office Action, U.S. Appl. No. 14/130,266, dated Jan. 20, 2016, 30 pages.
Non-Final Office Action, U.S. Appl. No. 14/130,266, dated Jul. 20, 2015, 26 pages.
Notice of Allowance, U.S. Appl. No. 14/130,266, dated Jul. 28, 2016, 12 pages.
Notification of Transmittal of International Search Report and Written Opinion, PCT Counterpart Application No. PCT/EP2012/059913, dated Aug. 17, 2012, 13 pages.
PCT International Preliminary Report on Patentability (Chaper I), PCT Counterpart Application No. PCT/EP2012/059913, dated Jan. 7, 2014, 7 pages.
Wi-Fi Alliance, Hotspot Technical Specification (Release 1) Version 1.0.0, Wi-Fi Alliance Wi-Fi Certified Passpoint program, May 7, 2012, 25 pages.
Office Action from foreign counterpart China Patent Application No. 201280032594.3, dated Oct. 31, 2016, 13 pages (English translation only).

* cited by examiner

WIFI FIXED WIRELESS PERSONAL SERVICES

CROSS-REFERENCE TO RELATED APPLICATIONS

This application is a continuation of application Ser. No. 14/130,266, entered Dec. 30, 2013 (now U.S. Pat. No. 9,521,549, issued Dec. 13, 2016), which is the National stage of International Application No. PCT/EP2012/059913, filed May 25, 2012, which claims priority to U.S. Provisional Application No. 61/503,214, filed Jun. 30, 2011, which are hereby incorporated by reference.

TECHNICAL FIELD

The present invention relates to WiFi fixed wireless personal services. More particularly, it relates to the use of Fixed Wireless Terminals or other types of WiFi access points using 3GPP as "last mile" access technology to interconnect mobile user devices to the core network of a cellular network operator.

BACKGROUND

A "Fixed Wireless Terminal" (FWT) is a device that can communicate wirelessly with the Radio Access Network of a cellular network operator in much the same way as a standard mobile device, e.g. a cellular telephone, smartphone, USB dongle and the like. It uses standard authentication mechanisms to connect to the cellular network, e.g. using a Universal Integrated Circuit Card (UICC) or Subscriber Identity Module (SIM) card. The FWT is fixed in the sense that it is not intended to be carried around by a person. In practice, its mobility may be constrained by the need for access to a power supply, and/or by its intended purpose. However, whilst a FWT may be fixed to a building (inside or out), it may also be located, for example, on a vehicle (bus, car) or train. The FWT provides an access point (to the cellular network) for user devices. The FWT will typically use WiFi to communicate wirelessly with these user devices.

Figure 1:
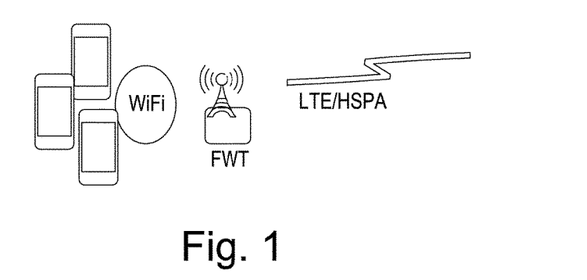
FIG. 1 illustrates schematically a user device access architecture involving a Fixed Wireless Terminal with mobile network broadband delivery.

In regions with limited copper (wire) availability for telecommunication services, the FWT offers an efficient and relatively low cost solution to the problem, providing a communications "hotspot". As long as users are within range of a FWT they are able to access telecommunication services. Another interesting possibility afforded by FWTs is the connection of legacy (GSM and 3G) terminals to high capacity Long Term Evolution (LTE) and High Speed Packet Access (HSPA) networks. In many regions it will take a considerable time for consumers to acquire LTE or HSPA enabled terminals, and the FWT will allow cellular network operators to take advantage of the backhaul capability and flexibility of LTE and HSPA infrastructure in the meantime. In such a scenario, the FWT provides an interface between the WiFi access and the LTE or HSPA access network. This is illustrated schematically in FIG. 1.

The 3GPP specification 23.402 and WiFi Alliance Hotspot 2.0 are concerned with fixed broadband connectivity to a WiFi access point. Access control and roaming in a WiFi access environment tends to be built around Wireless Internet Service Provider roaming (WiSPr) and emerging technologies using Extensible Authentication Protocol (EAP) Subscriber Identity Module (SIM)/Authentication and Key Agreement (AKA) authentication. Unless new functionality is introduced, these solutions will be inefficient for FWTs having mobile access broadband connectivity. Individual users behind the FWT are not seen by the mobile access network as they are hidden behind a NAT inside the FWT. Possible alternative solutions involve web login procedures and/or tunneling between the user devices and some central (e.g. Virtual Private Network (VPN)) server. However, such solutions are likely to be complex to implement and will not integrate well with existing mobile network architectures and policy control (e.g. for charging and Quality of Service (QoS) purposes).

SUMMARY

It is an object of the present invention provide an efficient solution to the problem of allowing wireless terminals to access a packet core network, of a cellular network operator, via an access point such as a Fixed Wireless Terminal.

According to a first aspect of the present invention there is provided a method by an access point to provide wireless terminals with access to a packet core network. The method comprises attaching to the packet core network via a cellular radio access network, where the attaching includes establishing a default Packet Data Network (PDN) connection between the access point and a packet gateway of the packet core network, where the access point is configured to operate as a router of a subnet associated with an Internet Protocol (IP) address space. The method further comprises relaying authentication and authorization signaling between a wireless terminal and the packet core network to authenticate and authorize the wireless terminal to access the packet core network, relaying further signaling between the wireless terminal and the packet core network to allocate to the wireless terminal an IP address from the IP address space, establishing a dedicated PDN connection for the wireless terminal between the access point and the packet gateway of the packet core network, establishing one or more dedicated bearers associated with the dedicated PDN connection, and routing packets between the wireless terminal and the packet core network via the one or more dedicated bearers associated with the dedicated PDN connection.

By configuring the access point as an IP router, whilst at the same time allocating IP addresses to wireless terminals from within the core network, increased control and flexibility are provided to the network operator when it comes to the provision of packet access services.

The wireless terminals are typically WiFi enabled, with the access point providing a WiFi hotspot towards the wireless terminals. The access point may further operate as a fixed wireless terminal, or a mobile wireless terminal, e.g. 3G or LTE, towards the cellular radio access.

Authenticating and authorizing the wireless terminal to access the packet core network may involve one of SIM/AKA and EAP. For example, authentication of the wireless terminal may involve a 802.1x exchange between the wireless terminal and the access point, and radius/EAP exchange between the access point and the packet core network. Relaying further signaling between the wireless terminal and the packet core network to allocate to the wireless terminal an IP address from the IP address space may result in policy rules being installed in a GGSN/PGW within the packet core network, the policies relating to the allocated IP address.

According to a second aspect of the present invention there is provided an access point for enabling wireless terminals to access a packet core network. The access point comprises a cellular radio controller for attaching to a packet core network via a cellular radio access network, where the attachment to the packet core network establishes a default Packet Data Network (PDN) connection between the access point and a packet gateway of the packet core network, and an IP router configured to operate as a router for a subnet associated with an IP address space, where the access router is configured to route packets between a wireless terminal and the packet core network via a dedicated bearer associated with a dedicated PDN connection established over the cellular radio access network for the wireless terminal. The access point further comprises a local radio controller configured to provide a wireless hotspot for wireless terminals within a local coverage area, and a signaling relay for relaying authentication signaling between the wireless terminal and the packet core network, and for relaying further signaling between the wireless terminal and the packet core network in order to allocate to the wireless terminal an IP address from the IP address space.

The access point may be a Fixed Wireless Terminal providing a WiFi service to local wireless terminals, and with the backhaul being provided by a High Speed Packet Access, HSPA, over 3G, or Long Term Evolution, LTE, cellular radio access network.

According to a third aspect of the present invention there is provided an Authentication, Authorization, and Accounting, AAA, server for use within a packet core network. The server comprises a first controller for authenticating and authorizing, via a cellular radio access network, an access point that is configured to operate as a wireless hotspot for wireless terminals, and a notifier for notifying a Dynamic Host Control Protocol, DHCP, server of the authentication and authorization of the access point and for installing in the DHCP server an IP address space of a subnet for which the access point is to act as router. The server further comprises a second controller for authenticating and authorizing, via the access point, individual wireless terminals.

The second controller of the AAA server may be configured to signal to a policy controller to initiate installation of uplink filters in the access point in respect of the authenticated and authorised wireless terminals.

DETAILED DESCRIPTION

As has been discussed above, there are many advantages, both to end users and to network operators, to introducing Fixed Wireless Terminals (FWTs) having mobile network broadband delivery (e.g. HSPA or LTE). However, building subscriber awareness behind these operator managed FWTs (FIG. 1) is important. A number of solutions are presented here. These are, as far as possible, compatible with existing user devices supporting EAP-SIM/AKA or other EAP methods for authentication, as well as with the key components from the ongoing work within WiFi Alliance Hotspot 2.0 working group using 802.1x and EAP methods.

Figure 2:
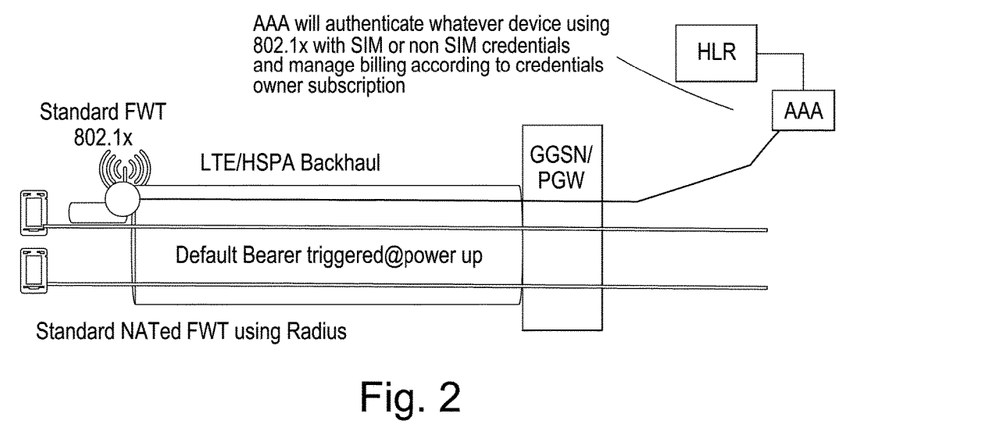
FIG. 2 illustrates schematically a first use case providing a relatively simple mechanism for connecting user terminals to a packet core network via an LTE or HSPA backhaul network.

FIG. 2 illustrates schematically a relatively simple solution (use "case 1") using NAT within the FWT, and adding authentication. [It should be understood that, for the purpose of illustration, certain network nodes and functions are illustrated that are standard specific. However, equivalents of these nodes will be readily apparent, and it will be understood that these nodes and functions may evolve and change over time.] Shown in the Figure are a (standard) FWT implementing the IEEE 802.1x WiFi interface, a LTE/HSPA backhaul network (details of this network are omitted for simplicity), a GGSN/PGW present within the mobile network operator's packet switched (PS) core network, an Authentication, Authorization and Accounting (AAA) server, and a Home Location Register (HLR).

Upon power up of the FWT, a default packet bearer is established between the FWT and the GGSN/PGW. Thereafter, EAP-SIM/AKA or other EAP methods for non-SIM based devices can be used with the FWT as authenticator for the devices behind the FWT. [This is handled by the wireless manager in these devices.] This solution shares the full bandwidth, with common Quality of Service (QoS), amongst all users behind the FWT, as well as class-based QoS where different FWTs can get different QoS classes. In this solution, different users within the same FWT cannot be given different QoS Class Indicators, QCIs, to allow differentiated packet handling). However, bandwidth management is for the hotspot as a whole and is not possible per subscriber. This approach also only allows for a relatively simple charging model, e.g. using Radius accounting (for time and volume based charging) based on start and stop of WiFi use for a given user. Nonetheless, the solution can scale to allow hundreds of devices to be connected to a given FWT.

Figure 3:
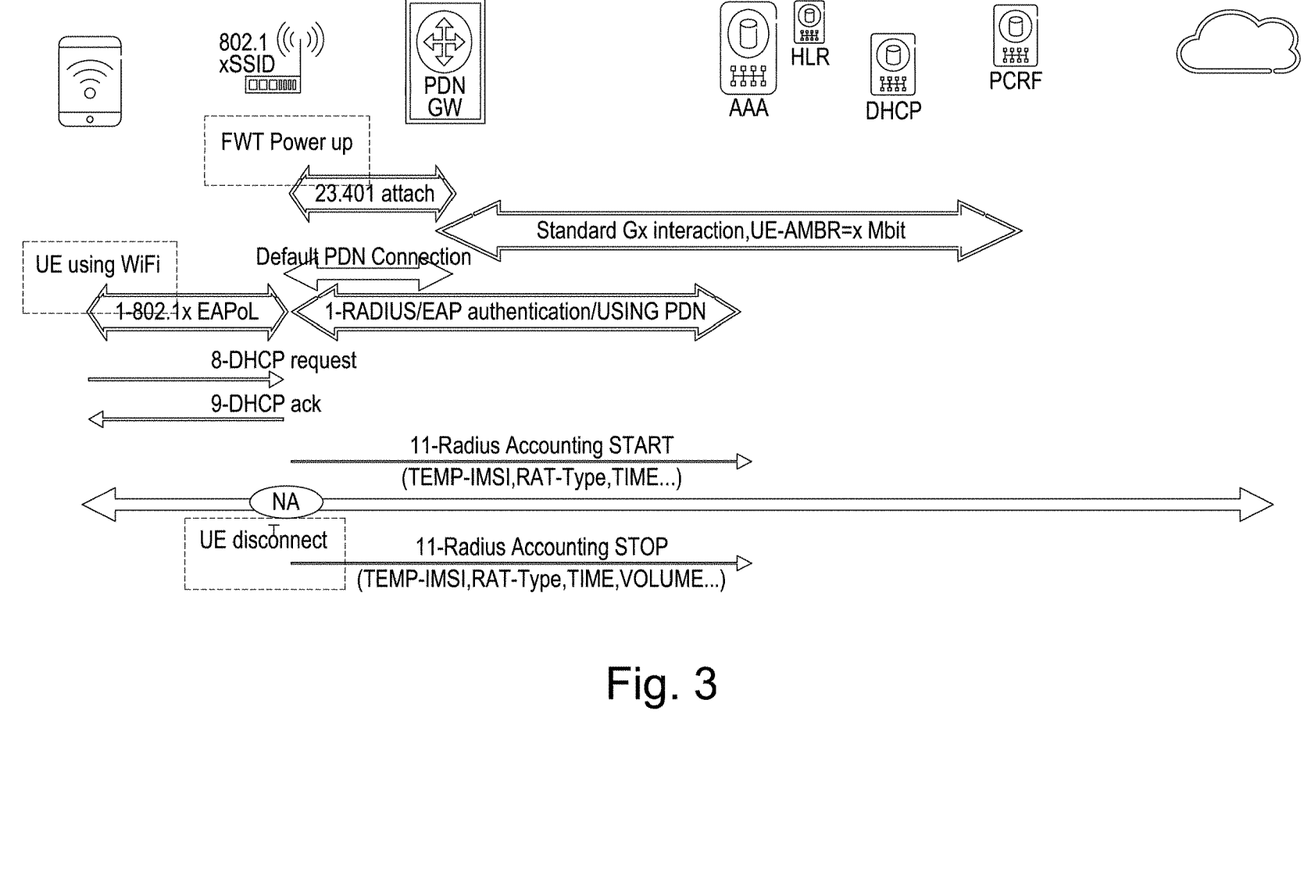
FIG. 3 illustrates a signalling flow according to the use case of FIG. 2.

Use case 1 is further illustrated in FIG. 3. The standard attach procedure is employed at power up of the FWT in order to connect the FWT to the mobile network and to establish a default Packet Data Network (PDN) connection between the FWT and the PGW (identified in this and further figures as "PDNGW"). Once this is done, 802.1x with EAP-SIM/AKA or other EAP methods is used to authenticate the WiFi device behind the FWT (piggybacking on the bearer associated with the default PDN connection). The DHCP process, used to provide an IP address to the device, is illustrated in a simplified manner with DHCP Discover omitted. All wireless devices behind the FWT send and receive IP packets via the default bearer.

Figure 4:
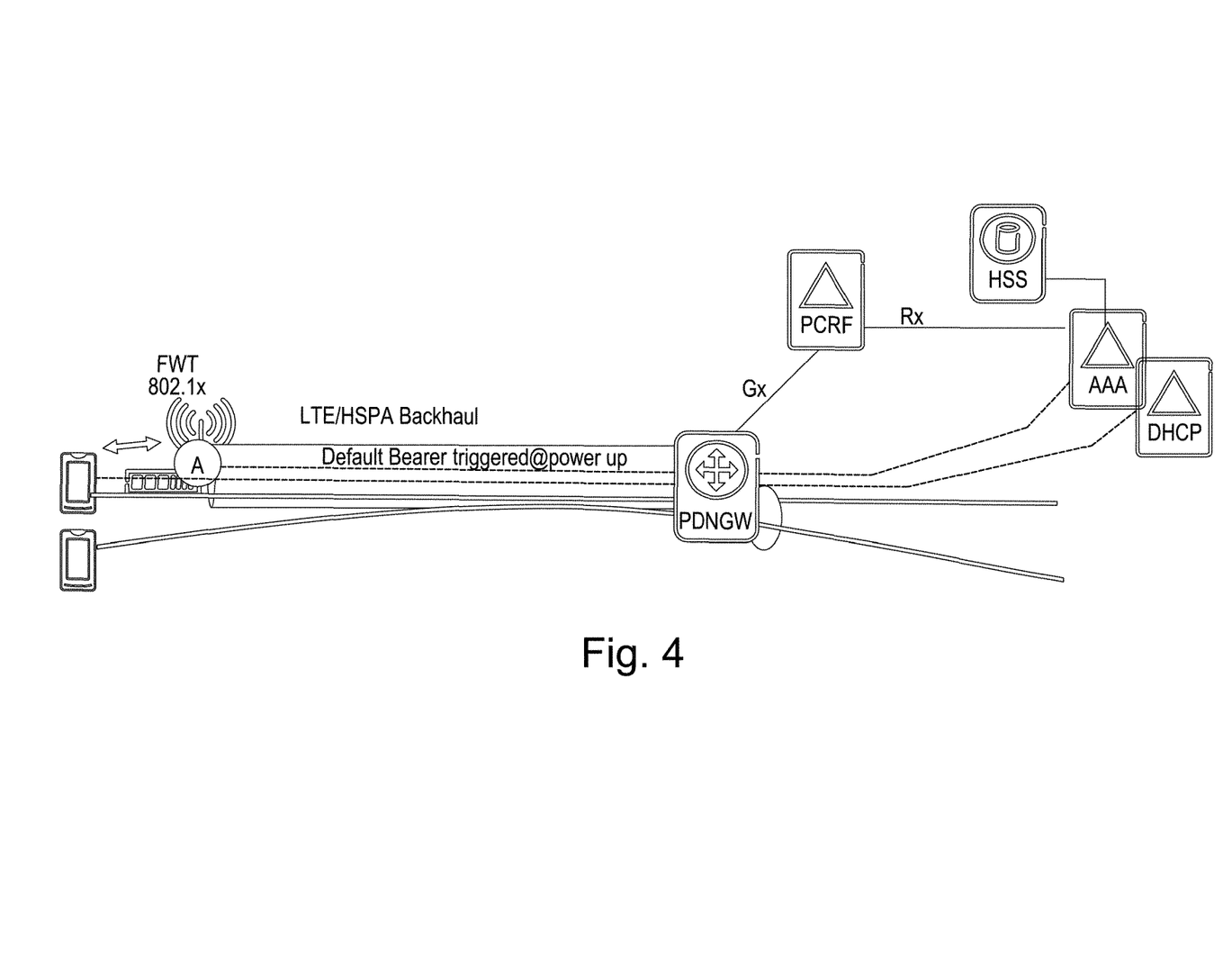
FIG. 4 illustrates schematically a second use case providing a mechanism for connecting user terminals to a packet core network via an LTE or HSPA backhaul network.

A second use case 2 is illustrated schematically in FIG. 4. This approach again employs a single bearer (i.e. that associated with the default PDN connection) to carry end user traffic, but without NATing at the FWT. This solution shares the full bandwidth between all WiFi devices, with common end-to-end (e2e) QoS. Charging rules/flow based charging and bandwidth management can be enforced in the GGSN/PGW on a per user basis. This solution can again scale to allow hundreds of devices to be connected to the FWT.

Figure 5:
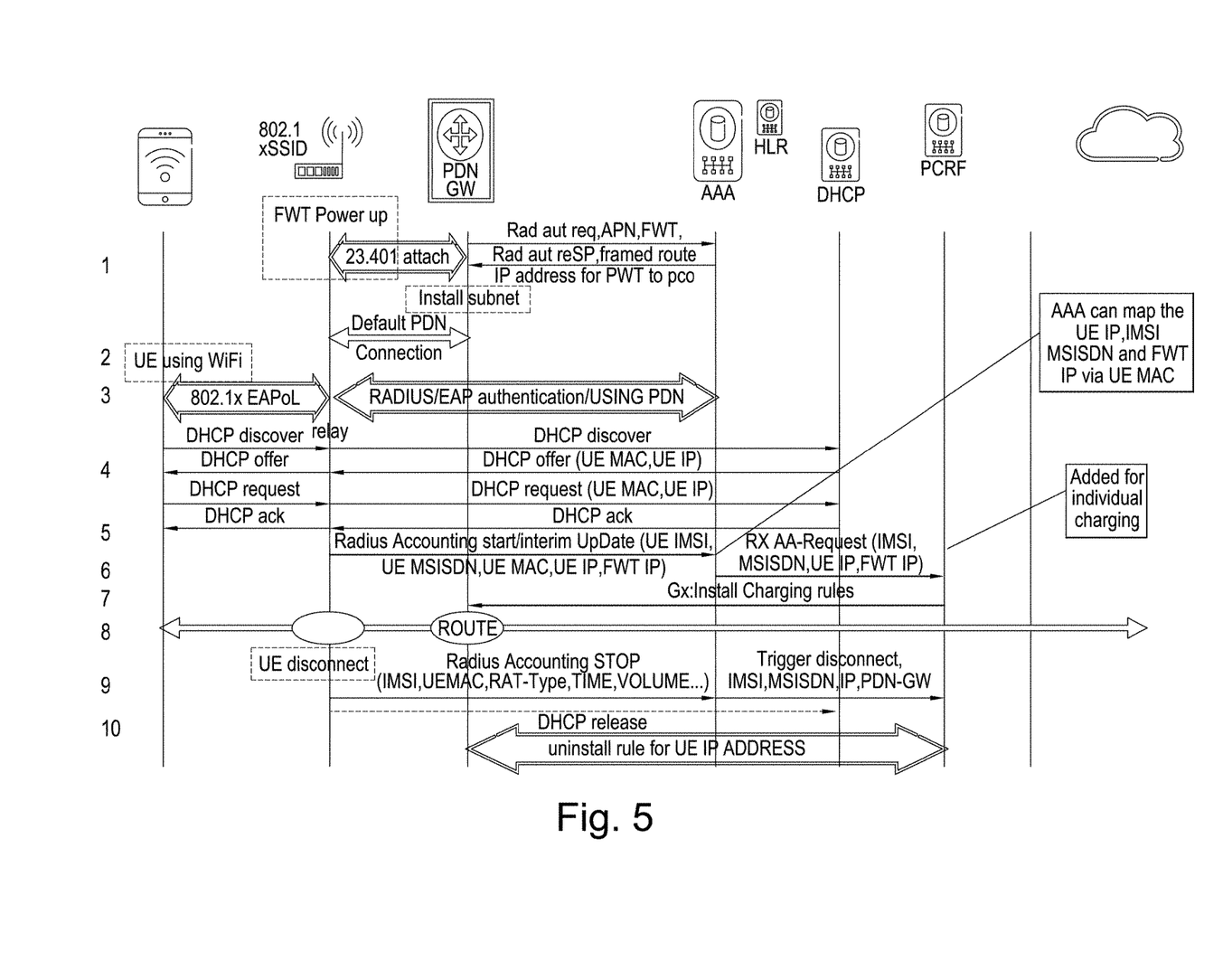
FIG. 5 illustrates a signalling flow according to the use case of FIG. 4.

Use case 2 is further illustrated in FIG. 5. The PGW is configured, upon power up of the FWT, to assign a subnet (i.e. IP address range) to the FWT. The FWT is configured to operate as a router. Once this is done, 802.1x with EAP-SIM/AKA or other EAP method is used to authenticate the WiFi device behind the FWT. The FWT uses DHCP relay to forward the DHCP request and enable the operator network to bind the DHCP session to the authenticated WiFi user. When the DHCP server has assigned a UE IP address, the FWT sends a Radius accounting message to the AAA server. The AAA server converts the accounting message to an Rx message and sends this to the PCRF.

An advantage of allowing the network to assign the IP address is that there is no requirement to provision the FWT on a per UE basis. On the other hand, the network servers have to be configured with the correct IP Subnet to be used.

The Gx interface is used to provision QoS and Charging rules, for a specific WiFi UE, in the GGSN or PGW which acts as a Policy Charging Enforcement Function (PCEF) according to the PCC architecture. These rules are installed by a Policy and Charging Rules Function (PCRF). In particular, the PCRF will map the UE IP address to a Gx session for the FWT. The PCRF will install a charging rule in the GGSN/PGW with AF-Charging-Identifier set to IMSI and/or MSISDN and with a FWT unique rating group per UE.

For offline charging, the FWT will generate accounting messages with separate containers per hotspot user (per rating group) that include volume together with user identity (AF-Charging-Identifier). For online charging, the Gy session for that FWT will generate one individual credit-instance (quota) per hotspot user (rating group), where each individual quota request will contain the WLAN user identity (AF-Charging-Identifier). For both the online and offline cases, a mediation-device might be required in order to convert the CDRs/Gy messages to a format that the charging system understands.

Returning to the signaling flow of FIG. 5, Radius accounting or DHCP release is used to trigger the close of charging records and release the IP address assigned to the UE.

Figure 6:
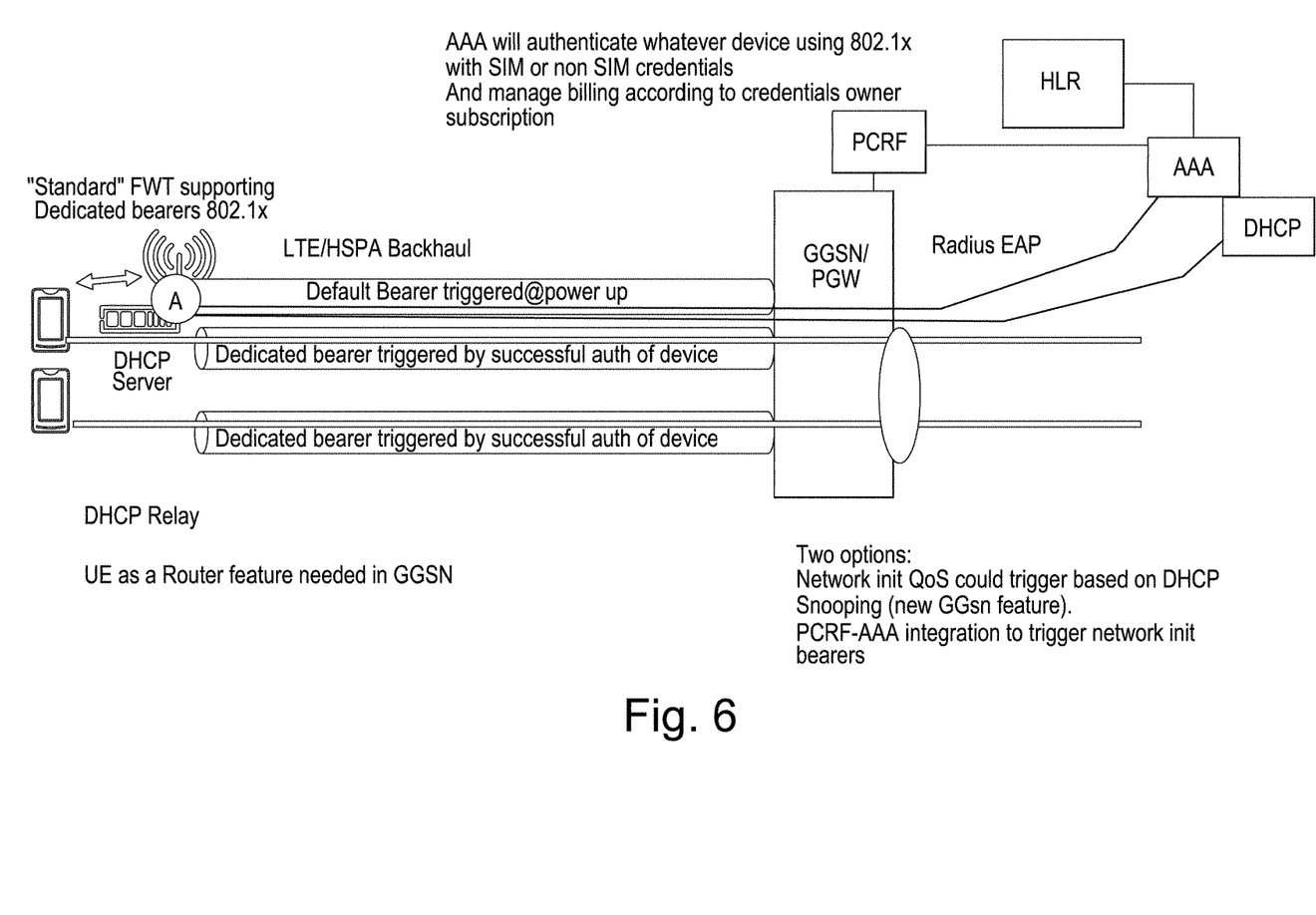
FIG. 6 illustrates schematically a third use case providing a mechanism for connecting user terminals to a packet core network via an LTE or HSPA backhaul network.

A more sophisticated solution, referred to here as use case 3, is illustrated schematically in FIG. 6. This solution provides for additional bearers that can be used to separate WiFi users on different Evolved Packet System (EPS) bearers, allowing different users to have different QoS. Dedicated bearers might be triggered, for example, by a network initiated QoS procedure triggered by DHCP Snooping, packet inspection or Policy control triggered by the DHCP authentication phase. However, use case 3 is limited insofar as a maximum of eight bearers can be established towards the FWT, potentially limiting its use to only eight UEs. Multiplexing several users (with the same QoS class) on the same bearer may be used to increase this capacity. An uplink QoS filter can be implemented using either Protocol Configuration Options (PCO) extensions or smart usage of the Traffic Flow Templates (TFTs), or using off path communication between the DHCP/AAA server and the UE to provision uplink filters, in the FWT, for a specific IP address.

Figure 7:
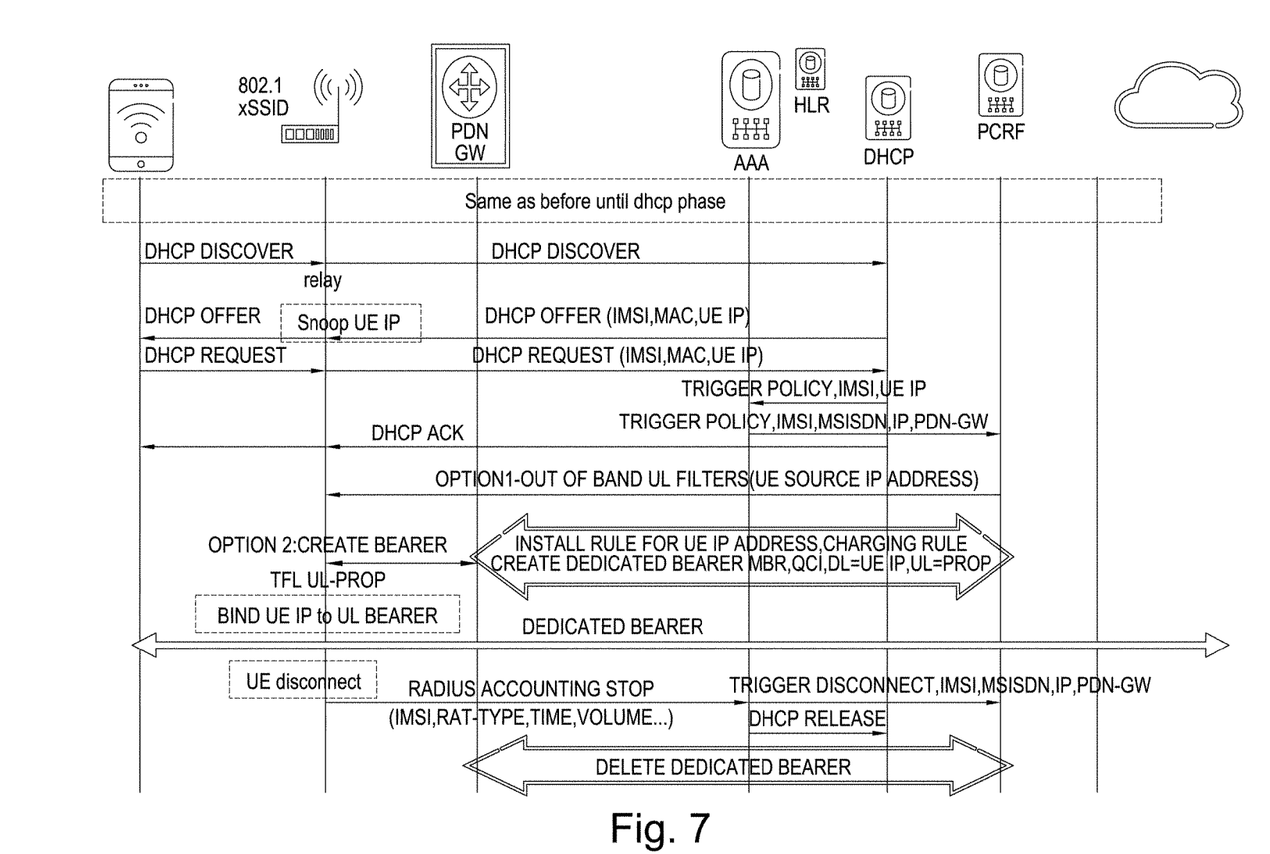
FIG. 7 illustrates a signalling flow according to the use case of FIG. 6.

Use case 3 is further illustrated in FIG. 7. The call flow utilizes the same steps as use case 2, up to the UE initiated DHCP phase, and including establishment of the default PDP connection. Standard DHCP is used from each WiFi UE. The DHCP phase triggers the setup of a dedicated EPS bearer for a WiFi enabled UE. Uplink filters can be installed in the FWT, for example, in two different ways, namely:

Option 1. Out of band autoprovisioning of uplink policies at the WiFi UE from a backend server, for instance piggybacked on Radius Authentication for a subscriber. This would contain a UE IP address to be mapped towards a dedicated bearer in the FWT.

Option 2. Use of proprietary extensions or interpretation of the options signalled to the UE as part of the dedicated bearers setup. This approach may be less desirable however as it would likely require changes to lower level network architecture signaling.

Once the dedicated bearer has been set up between the core network and the FWT, and the uplink filters have been installed in the FWT, the FWT will bind the UE IP address to the dedicated bearer. Again, Radius accounting or DHCP release is used to trigger the close of charging records and release the IP address assigned to the UE.

Figure 8:
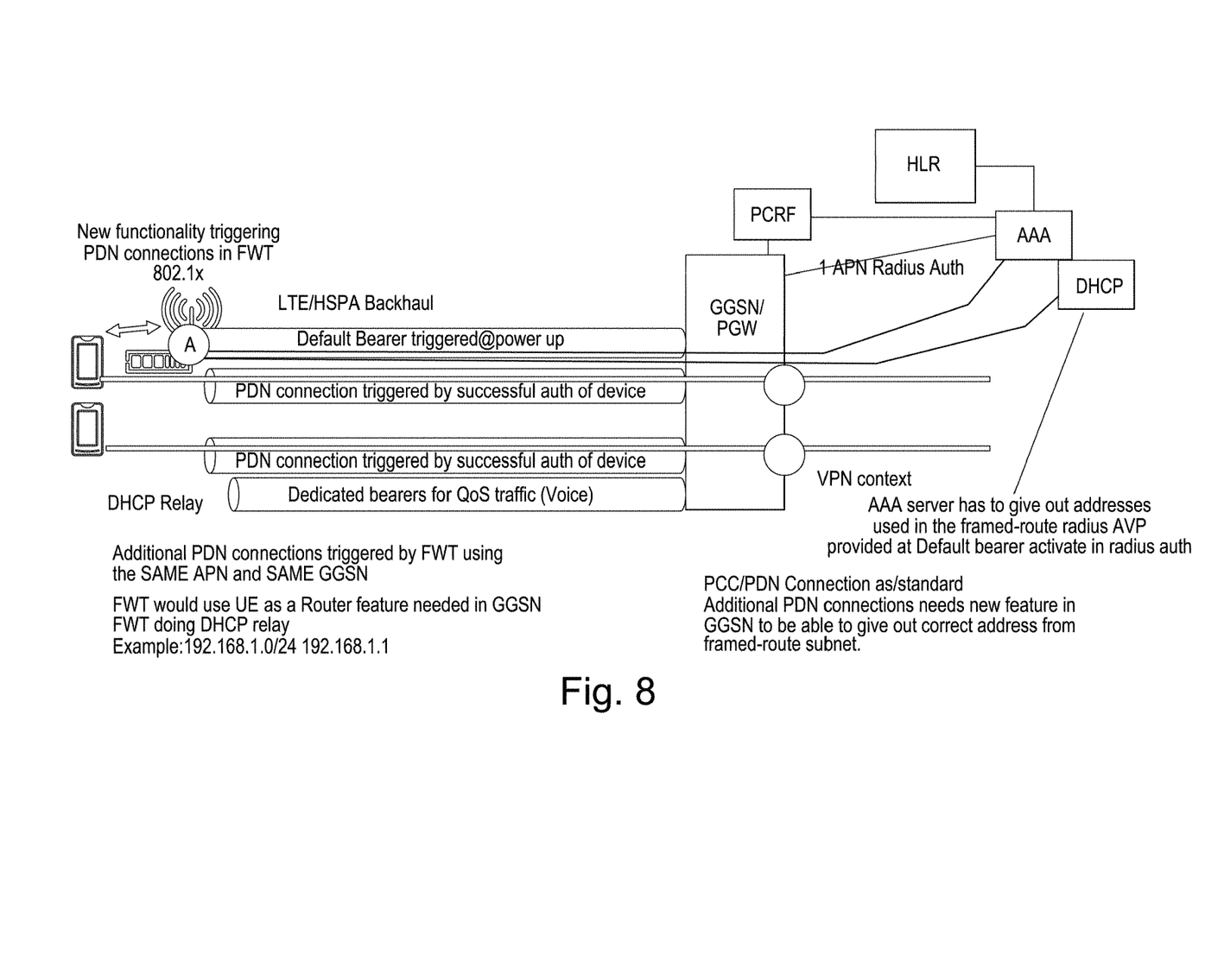
FIG. 8 illustrates schematically a fourth use case providing a mechanism for connecting user terminals to a packet core network via an LTE or HSPA backhaul network.

FIG. 8 illustrates a use case 4 which is able to provide full Policy and Charging Control (PCC) on a per subscriber basis, by allocating a PDN Connection per UE with one or more dedicated bearers associated with it. This use case does limit scalability in terms of number of users, making it more suitable to high QoS demanding services and not widely available hotspot services.

Figure 9:
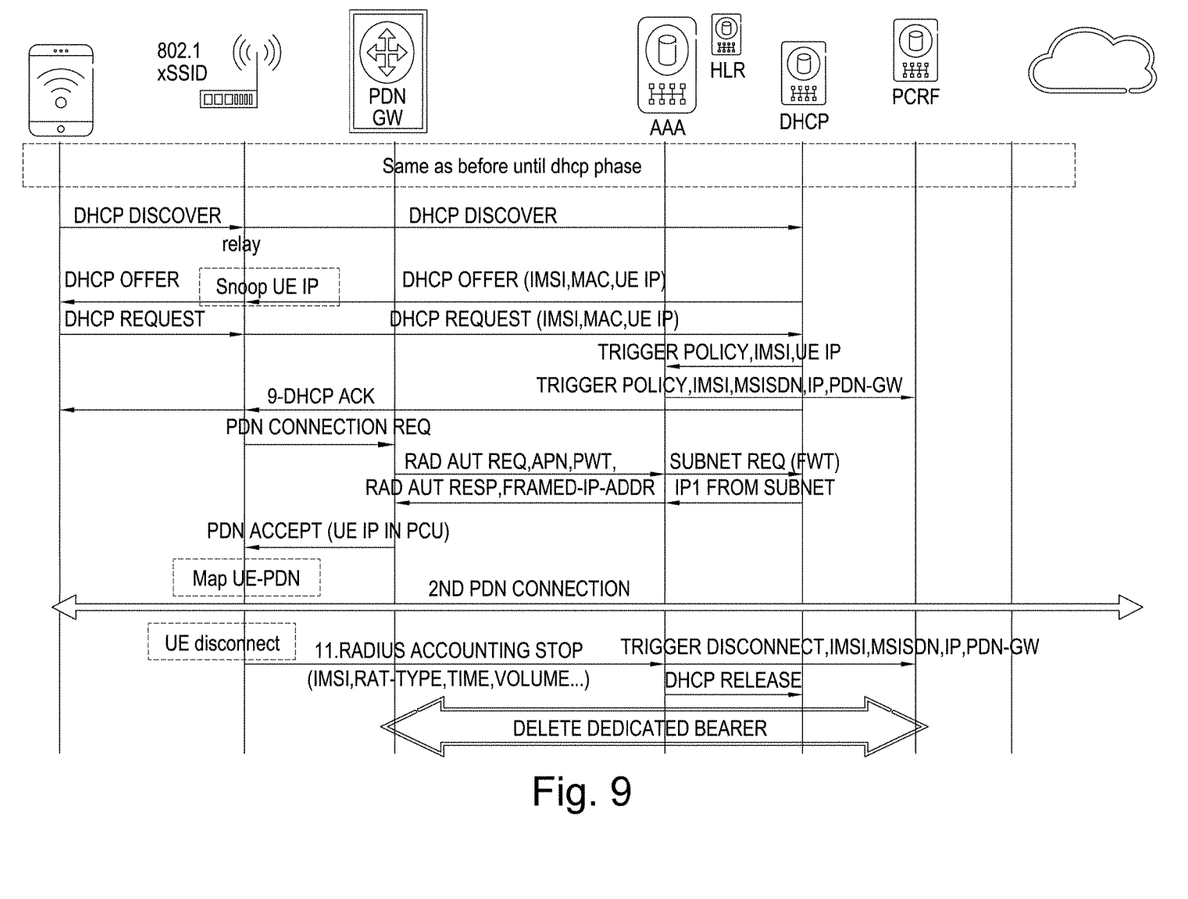
FIG. 9 illustrates a signalling flow according to the use case of FIG. 8.

Use case 4 is further illustrated in FIG. 9. Again, the call flow utilizes the same steps as use case 2, up to the UE initiated DHCP phase, and including establishment of the default PDP connection (with associated default bearer). Standard DHCP is used from each WiFi UE. The FWT "snoops" the DHCP ACK and uses this event to trigger a further PDN connection setup with the PGW. This approach will provide the UE with a unique IP address used for the default bearer as part of the PDN Connection setup. A UE may establish additional bearers associated with its dedicated PDN connection (not shown in FIG. 9). For the disconnect procedure, the FWT or network could trigger PDN disconnect and release the associated WiFi UE resources.

Figure 10:
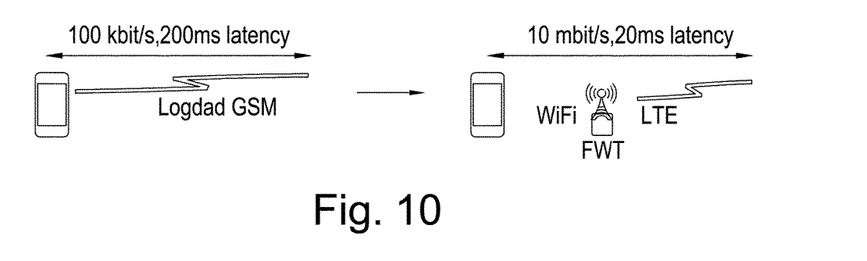
FIG. 10 illustrates bandwidth and latency rates available via a loaded GSM access network and via a FWT with an LTE backhaul network.

The use cases presented above, involving as they do authentication of SIM-based devices in an automatic fashion, allow users with GSM+WiFi terminals to utilize the latest HSPA/LTE enhancements without changing terminals. The terminals are not limited by the bandwidth available via the GSM technology. The use cases enable operators to benefit quickly from their investments in LTE and HSPA infrastructure. This is illustrated in FIG. 10 which contrasts the bandwidth and latency rates available with these use cases, with that available via the conventional GSM architecture.

Figure 11:
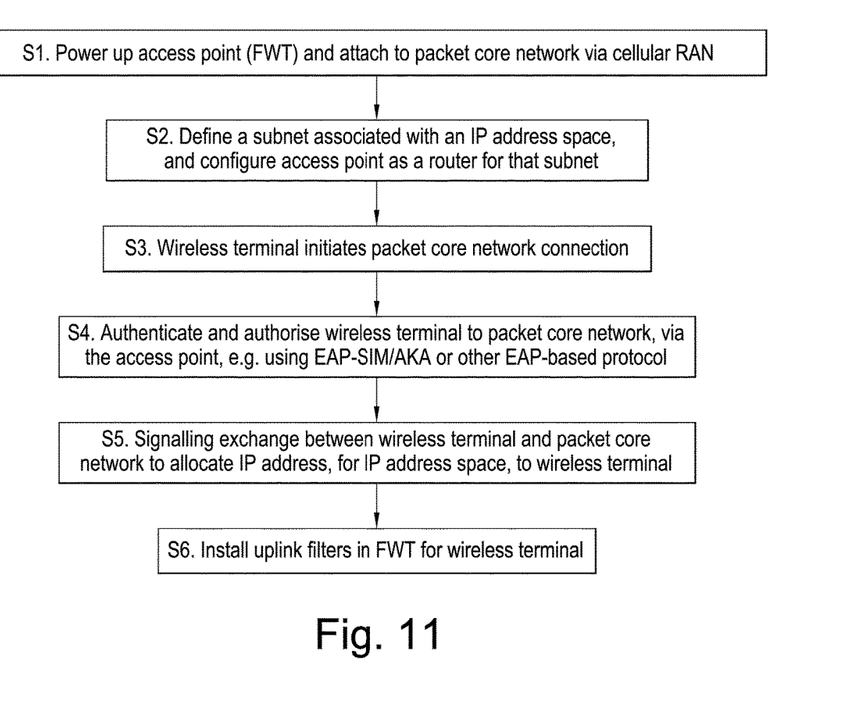
FIG. 11 is a flow diagram illustrating a process for allowing wireless terminals to connect to a packet core network via a fixed wireless terminal.

FIG. 11 is a flow diagram illustrating various operations in a procedure for attaching a wireless terminal (UE) to a packet core network via a FWT. At block S1, the FWT is powered up and is attached to the packet core network, via the cellular Radio Access Network (RAN), using standard attachment procedures. At block S2, the core network defines a subnet, associated with an IP address space, and configures the FWT (access point) as a router for that subnet.

Then, at block S3, a wireless terminal initiates a packet core network connection. Authentication and authorization signaling is exchanged between the wireless terminal and the core network, via the FWT, S4, to authenticate and authorize the terminal. At block S5, the wireless terminal then exchanges signaling with the core network in order to allocate an IP address, from the subnet range, to the wireless terminal. At block S6, uplink packet filters are installed, by the core network, into the FWT, in respect of the wireless terminal. The terminal can then begin to send and receive packet data via the FWT.

Figure 12:
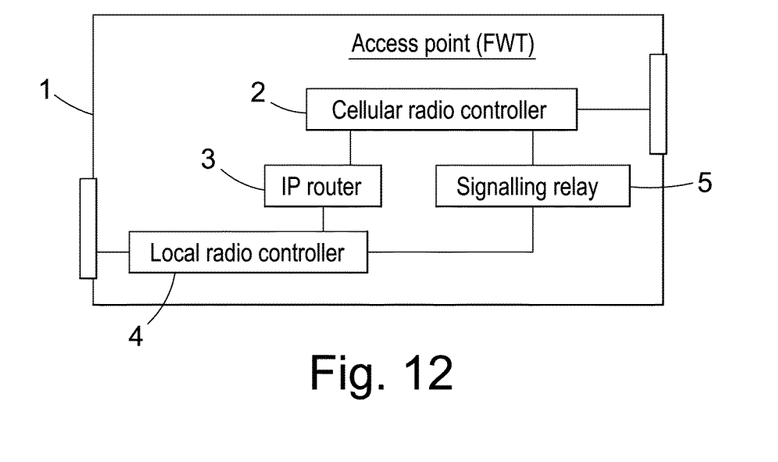
FIG. 12 illustrates schematically a Fixed Wireless Terminal suitable for use with the process of FIG. 11.

Referring now to FIG. 12, this illustrates schematically an access point (FWT) 1 suitable for use with the access procedure discussed above. A cellular radio controller 2 is provided for enabling the FWT to attach to a packet core network via a cellular radio access network. Coupled to the cellular radio controller 2 is an IP router 3, configured to operate as a router for a subnet associated with an IP address space. Coupled in turn to the IP router 3 is a local radio controller 4 configured to provide a wireless hotspot for wireless terminals within a local coverage area. Coupled between the cellular radio controller 2 and the local radio controller 4 is a signalling relay 5. This signalling relay 5 relays authentication signalling between a wireless terminal and the packet core network, as well as relaying further signalling between the wireless terminal and the packet core network in order to allocate to the wireless terminal an IP address from said IP address space. It will be appreciated that the functional entities illustrated in FIG. 12 may in practice be implemented by respective processors and memories, or may be implementing using shared processors and memories.

Figure 13:
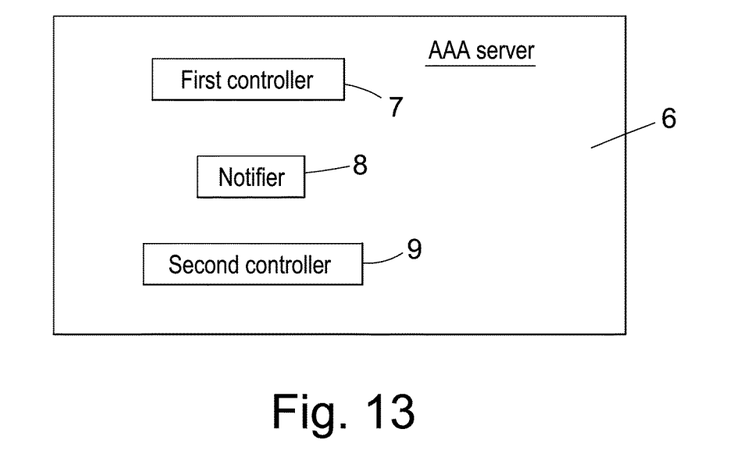
FIG. 13 illustrates schematically a AAA server suitable for use with the process of FIG. 11.

FIG. 13 illustrates schematically a AAA server 6 configured for use within a packet core network to enable the procedure discussed above. The server 6 comprises a first controller 7 for authenticating and authorizing, via a cellular radio access network, an access point (FIG. 12) that is configured to operate as a wireless hotspot for wireless terminals. The server also comprises a notifier 8 for notifying a DHCP server of the authentication and authorization of the access point and for installing in the DHCP server an IP address space of a subnet for which the access point is to act as router. Further, and a second controller 9 is provided for authenticating and authorizing, via the access point, individual wireless terminals. It will be appreciated that the functional entities illustrated in FIG. 13 may in practice be implemented by respective processors and memories, or may be implementing using shared processors and memories.

It will be appreciated by the person of skill in the art that various modifications may be made to the above described embodiments without departing from the scope of the present invention.

What is claimed is:

1. A method performed by an access point to provide wireless terminals with access to a packet core network, the method comprising:
    attaching to the packet core network via a cellular radio access network, wherein the attaching includes establishing a default Packet Data Network (PDN) connection between the access point and a packet gateway of the packet core network, wherein the access point is configured to operate as a router of a subnet associated with an Internet Protocol (IP) address space;
    relaying authentication and authorization signaling between a wireless terminal and the packet core network to authenticate and authorize the wireless terminal to access the packet core network;
    relaying further signaling between the wireless terminal and the packet core network to allocate to the wireless terminal an IP address from the IP address space;
    snooping the further signaling between the wireless terminal and the packet core network to determine whether the wireless terminal has been allocated the IP address from the IP address space;
    establishing a dedicated PDN connection for the wireless terminal between the access point and the packet gateway of the packet core network in response to a determination, based on the snooping, that the wireless terminal has been allocated the IP address from the IP address space;
    establishing one or more dedicated bearers associated with the dedicated PDN connection; and
    routing all packets between the wireless terminal and the packet core network that require quality of service (QoS) via the one or more dedicated bearers associated with the dedicated PDN connection.

2. The method according to claim 1, wherein the access point is a WiFi access point and the wireless terminal communicates with the access point using WiFi protocols.

3. The method according to claim 1, wherein the cellular radio access network utilizes High Speed Packet Access (HSPA) over 3G, or Long Term Evolution (LTE).

4. The method according to claim 1, wherein authenticating and authorizing the wireless terminal to access the packet core network comprises utilizing an Authentication, Authorization, and Accounting (AAA) server in the packet core network.

5. The method according to claim 4, wherein authenticating and authorizing the wireless terminal to access the packet core network comprises using Extensible Authentication Protocol (EAP) Subscriber Identity Module (SIM)/Authentication and Key Agreement (AKA) or another EAP-based protocol.

6. The method according to claim 5, wherein authenticating and authorizing the wireless terminal to access the packet core network comprises an 802.1x exchange between the wireless terminal and the access point, and a radius/EAP exchange between the access point and the AAA server.

7. The method according to claim 4, wherein policies are installed for the wireless terminal in the packet gateway of the packet core network, policies being applied to downlink packets based upon the allocated IP address, wherein installation of a policy is triggered by the AAA server signaling to a Policy Charging Rules Function (PCRF), which in turn installs the policy in the packet gateway and/or access point.

8. The method according to claim 1, wherein the further signaling between the wireless terminal and the packet core network comprises a Dynamic Host Control Protocol (DHCP) signaling between the wireless terminal and the access point, and between the access point and a DHCP function in the packet core network.

9. The method according to claim 1, wherein attaching to the packet core network further includes establishing a default bearer between the access point and the packet gateway of the packet core network, wherein the default bearer is associated with the default PDN connection, the method further comprising:
    routing packets between a second wireless terminal and the packet core network via the default bearer.

10. The method according to claim 1, the method further comprising:
    following authentication of a second wireless terminal, establishing, for the second wireless terminal, a dedicated bearer associated with the default PDN connection and routing packets between the second wireless terminal and the packet core network via the dedicated bearer associated with the default PDN connection.

11. The method according to claim 1, wherein policies are installed for the wireless terminal in the packet gateway of the packet core network, policies being applied to downlink packets based upon the allocated IP address.

12. The method according to claim 1, further comprising: installing policies for the wireless terminal at the access point, policies being applied to uplink packets based upon the allocated IP address.

13. An access point for enabling wireless terminals to access a packet core network, the access point comprising:
a cellular radio controller, configured to attach to a packet core network via a cellular radio access network, wherein the attachment to the packet core network establishes a default Packet Data Network (PDN) connection between the access point and a packet gateway of the packet core network;
an Internet Protocol (IP) router, configured to operate as an access router for a subnet associated with an IP address space, wherein the access router is configured to route all packets between a wireless terminal and the packet core network that require quality of service (QoS) via a dedicated bearer associated with a dedicated PDN connection established over the cellular radio access network for the wireless terminal;
a local radio controller, configured to provide a wireless hotspot for wireless terminals within a local coverage area; and
a signaling relay, configured to relay authentication signaling between the wireless terminal and the packet core network, and to relay further signaling between the wireless terminal and the packet core network in order to allocate to the wireless terminal an IP address from the IP address space, wherein the access router is further configured to snoop the further signaling between the wireless terminal and the packet core network to determine whether the wireless terminal has been allocated the IP address from the IP address space, and wherein the access router is further configured to establish the dedicated PDN connection in response to a determination, based on the snooping, that the wireless terminal has been allocated the IP address from the IP address space.

14. The access point according to claim 13, wherein the local radio controller is configured to provide a WiFi hotspot.

15. The access point according to claim 13, wherein the access point is a Fixed Wireless Terminal, and wherein the cellular radio controller is configured to interoperate with the cellular radio access network using High Speed Packet Access (HSPA) over 3G, or Long Term Evolution (LTE) communication protocols.

16. The access point according to claim 13, wherein the signaling relay is configured to employ an 802.1x exchange with the wireless terminal and a radius/Extensible Authentication Protocol (EAP) exchange with an Authentication, Authorization, and Accounting (AAA) server within the packet core network.

17. The access point according to claim 13, wherein the access router is configured to route packets, between a plurality of wireless terminals and the packet core network via a single default bearer associated with the default PDN connection.

18. The access point according to claim 13, wherein the access router is configured to route packets between a second wireless terminal and the packet core network via a dedicated bearer established for the second wireless terminal, wherein the dedicated bearer established for the second wireless terminal is associated with the default PDN connection.

* * * * *